United States Patent [19]
McAllister et al.

[11] Patent Number: 5,978,450
[45] Date of Patent: Nov. 2, 1999

[54] PERSONAL DIAL TONE

[75] Inventors: Alexander I. McAllister, Silver Spring, Md.; Robert D. Farris, Sterling, Va.; Michael J. Strauss, Potomac, Md.

[73] Assignee: Bell Atlantic Network Services, Inc., Arlington, Va.

[21] Appl. No.: 08/828,959

[22] Filed: Mar. 28, 1997

[51] Int. Cl.[6] .................................................. H04M 7/00
[52] U.S. Cl. ..................... 379/88.02; 379/201; 379/207
[58] Field of Search .............................. 379/88.01, 88.02, 379/88.03, 201, 207, 210, 211, 212, 216, 229, 230

[56] References Cited

U.S. PATENT DOCUMENTS

| | | | |
|---|---|---|---|
| 4,313,035 | 1/1982 | Jordan et al. | 379/207 |
| 4,899,373 | 2/1990 | Lee et al. | 379/207 |
| 5,206,899 | 4/1993 | Gupta et al. | 379/120 |
| 5,247,571 | 9/1993 | Kay et al. | 379/207 |
| 5,329,578 | 7/1994 | Brennan et al. | 379/201 |
| 5,430,791 | 7/1995 | Feit et al. | 379/88.01 |
| 5,465,290 | 11/1995 | Hampton et al. | 379/207 |
| 5,515,426 | 5/1996 | Yacenda et al. | 379/201 |
| 5,572,583 | 11/1996 | Wheeler, Jr. et al. | 379/207 |
| 5,586,177 | 12/1996 | Farris et al. | 379/230 |
| 5,661,791 | 8/1997 | Parker | 379/207 |
| 5,719,921 | 2/1998 | Vysotsky et al. | 379/189 |
| 5,761,290 | 6/1998 | Farris et al. | 379/207 |
| 5,825,865 | 10/1998 | Oberlander et al. | 379/211 |

*Primary Examiner*—Daniel S. Hunter
*Attorney, Agent, or Firm*—McDermott, Will & Emery

[57] ABSTRACT

A telephone network provides personalized communication services based on a voice identification of the subscriber. When a person requests a service, the network executes a speaker identification/verification procedure to identify the person as a subscriber. A switching office utilizes profile data associated with the identified subscriber to control services over a predetermined communication link. For example, on an outgoing call over a telephone line, the speaker identification/verification process provides a virtual office equipment number corresponding the identified subscriber. The central office switch servicing the outgoing call receives the virtual office equipment number and uses that number to retrieve a service profile associated with the subscriber. The switch provides a personalized form of "dial tone" like service to the subscriber by processing the outgoing call using the profile. The personalized services to several subscribers sharing a common line. The network may monitor ongoing speech during a call, to ensure use of the service only by the identified subscriber, for example in a prison application. The network also can provide the personalized services in response to dial-up access and activation.

37 Claims, 5 Drawing Sheets

PERSONAL DIAL TONE

TECHNICAL FIELD

The present invention relates to personalized telecommunications services, preferably offered through an intelligent telephone network.

ACRONYMS

The written description uses a large number of acronyms to refer to various services, messages and system components. Although generally known, use of several of these acronyms is not strictly standardized in the art. For purposes of this discussion, acronyms therefore will be defined as follows:
Advanced Intelligent Network (AIN)
Automatic Number Identification (ANI)
Call Processing Record (CPR)
Central Office (CO)
Common Channel Interoffice Signalling (CCIS)
Data and Reporting System (DRS)
Generic Data Interface (GDI)
Integrated Service Control Point (ISCP)
Integrated Services Digital Network (ISDN)
ISDN User Part (ISDN-UP)
Intelligent Peripheral (IP)
Multi-Services Application Platform (MSAP)
Office Equipment (OE)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND ART

Telephone service has become virtually ubiquitous throughout the modern world. A person can simply take a telephone off-hook, dial a destination telephone number, and if someone answers the called telephone, the caller can converse with another party anywhere in the world.

Today, however, the public switched telephone network (PSTN) and other telephone networks such as cellular systems provide most telephone services based on number identification of the telephone set or line that each party uses. Services are personalized only to the extent that a party uses the same line and/or instrument. For example, a person typically has one set of service features and billing options available via a telephone on the person's desk at the office, another set of service features and billing options available via the telephone line to their home and perhaps a third set of service features and billing options available via a wireless telephone (e.g. cellular or personal communications service (PCS)). The networks process calls to and from each of these different subscriber telephones based on a separate telephone number.

The proliferation of services causes subscribers inconvenience. For example, circumstances arise in which a subscriber may want a feature or billing option normally associated with one line or instrument, such as the office telephone, when they are in fact using a different line or instrument such as their home or PCS telephone. Also, the extreme increase in demand for telephone services is rapidly exhausting the capacity of the network, particularly in terms of the telephone numbers available under the current numbering plan.

A number of specific solutions have been proposed for individual problems, such as work at home and/or transfer of service to new location(s) as an individual travels. However, each of these solutions is limited or creates its own new problems.

For example, U.S. Pat. No. 4,313,035 to Jordan et al. discloses a method of using an intelligent network to provide a 'follow-me' type service through multiple exchanges of the switched telephone network using an AIN type of telephone system architecture. Each subscriber to the locator service has a unique person locator telephone number. To access the system to update data in a service control database, the subscriber dials 0700 and his unique person locator telephone number. The telephone switching office routes the call to a traffic service position system (TSPS) which prompts the caller (e.g. provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record. A caller wishing to reach the subscriber dials the subscriber's unique person locator number. A telephone switching office sends the dialed number to the central database. The database retrieves the stored completion number for the called subscriber and forwards that number back to the switching office to complete the call.

The Jordan et al. approach allows calls to follow the subscriber to each new location, but the subscriber must have a unique telephone number for this service. Each station that receives a call also must have a unique telephone number. As such, the Jordan et al. approach actually exacerbates the shortage of telephone numbers. Also, Jordan et al. rely on subscriber input of identification numbers. Subscribers often find this inconvenient, and this technique is often prone to number entry errors.

U.S. Pat. No. 4,899,373 to Lee et al. discloses a system for providing special telephone services to a customer on a personal basis, when the customer is away from his or her home base or office. The personalized services are provided in a multiple exchange office environment, using a central database for feature control. The nationally accessible central database system stores feature data in association with personal identification numbers. A subscriber wishing to use his personalized features while away from home base dials a special code and presents the personal identification number. The exchange transmits a query to the central database, and the corresponding feature data is retrieved from the database. The database forwards the feature data to the exchange, and the exchange stores the received feature data in association with the station from which the request was initiated. Subsequently, the exchange accesses the downloaded feature data to provide telephone service corresponding to the subscriber's personalized telephone features via the station the subscriber is currently operating from. A temporary office arrangement may be established in which the personalized features will be immediately available on incoming and outgoing calls for a period of time specified by the subscriber.

U.S. Pat. No. 5,206,899 to Gupta et al. pertains to a system wherein a subscriber can assign desired characteristics to any "target station" which is an active telephone accessible to a telecommunications network. A call thereafter that originates from the target station can use customized features, such as account code dialing and corporate billing arrangements. Initially, a service profile is created and stored for each subscriber and contains information describing desired features and billing options. The characteristics of a particular target station are changed by an activation process that can be initiated from any location. Automatic number identification (ANI) information associated with the target station is entered into an ANI trigger table in an intelligent switch, and the service profile is loaded into a database. When a call originates from the target station, information in the database is applied to the switch to provide the desired characteristics. An example of one of the features is when an employee of company X wishes to make business related calls from his/her telephone, the call has the characteristics of a call made from the office by a special billing arrangement.

Like Jordan, the Lee et al. and Gupta et al. systems depend on a dialed number entry by the subscriber to activate the service. Also, the Lee et al. and Gupta et al. systems do not provide a simple manner for more than one subscriber to obtain personalized service over the same telephone line. In Lee et al., during the period when the switch stores the roaming subscriber's profile in association with the line, all calls are processed based on that one profile. Similarly, in Gupta et al., while the ANI trigger is set against the line, all outgoing calls cause database access and use of the subscriber's profile in the database. There is no way to fall back on the normal profile for that line unless and until the service for the roaming subscriber is cancelled with respect to that one line.

U.S. Pat. No. 5,247,571 to Kay et al. discloses an Area Wide Centrex service provided by an advanced intelligent telephone network. The service provides centrex features, such as extension dialing, to multiple locations. The Kay et al. Patent also suggests a Work-at-Home feature. This feature allows the home telephone line to selectively operate as a residential line or as a Centrex business line, on a call-by-call basis. For a business call, the user would preface the call with an access indicator to identify a business call. When an outgoing call from the home line lacks the access indicator, the network processes the call as a standard residential call.

The Work-at-Home feature in the Kay et al. system requires only dialing of a code before each outgoing business call. However, the Kay et al. approach requires that the business profile is stored in association with the home line before the subscriber makes the call. The subscriber can use the Centrex billing and service features from the business account only from a home telephone previously associated with the business line. The subscriber can not use the billing and service features from the business account from any randomly selected telephone. Also, from the home line, a person can either use the normal residential profile service or the pre-defined business profile service. There is insufficient flexibility to enable a wider range of services for multiple subscribers through the one line.

DISCLOSURE OF THE INVENTION

The present invention addresses the above noted problems and provides advances over the existing technology by personalizing telecommunication services based on a speech authenticated identification of the actual subscriber. Offices of a communication network utilize profile data associated with the identified subscriber, rather than profile data associated with a particular telephone number or a particular communication link. In many of the preferred service applications, the network uses a virtual office equipment number assigned to the subscriber's profile data to retrieve the data for providing a requested service, reducing or eliminating the need for assignment of additional telephone numbers.

In one aspect, the invention relates to a communication network. The network includes at least one central office for processing calls originated over a plurality of communication links. The central office includes mass storage containing subscriber profiles. A peripheral coupled to the central office provides a voice authentication capability. In operation, the peripheral analyzes speech of a caller to identify the caller as a subscriber. Based on the identification, the peripheral provides an office equipment number assigned to the identified subscriber to the central office. The central office retrieves profile information corresponding to the office equipment number and processes at least one call using the retrieved profile information.

The preferred implementation of the communication network is an intelligent implementation of a public switched telephone network. The preferred network includes a number of central office switches interconnected by trunk circuits and servicing a substantial number of telephone links. The intelligent network also includes a service control point storing a database of records used in controlling services provided through the central offices. A first signaling network carries signaling messages between the offices as well as signaling messages between the offices and the service control point. The peripheral also may exchange signaling information with the service control point, preferably over a second signaling network.

Another aspect of the invention relates to an improved central office switching system capable of processing a call using profile information selected in response to a virtual equipment number. An office equipment number is 'virtual' where it is assigned to an individual subscriber, instead of to specific network equipment such as a line termination or a specific station.

The switching system includes interface modules coupled to the communication links and a switch providing selective communication connections between the interface modules. An administrative module controls connections provided by the switch. The administrative module includes mass storage containing subscriber profiles, a processor for providing control instructions to the switch, and a signaling interface for signaling communication with at least one external network node. In response to a virtual office equipment number received via the signaling interface, e.g. from a separate peripheral platform as discussed above, the processor retrieves a subscriber profile corresponding to the virtual office equipment number from the mass storage. The processor uses the retrieved profile to process a selective connection through the switch between two of the interface modules.

The inventive switching system and network can offer a variety of communication services on a personalized basis, and the invention encompasses a wide range of call processing methods which utilize speech identification of subscribers to select the appropriate profile data and/or use of profiles selected in response to virtual office equipment numbers.

For example, in another aspect, the present invention relates to a call processing method. The method includes the steps of detecting a service request and receiving and processing speech signals to identify a person as one of a plurality of subscribers. A switching office is instructed to utilize profile data corresponding to the identified subscriber for processing of a communication service over a predetermined link. In the preferred embodiment, the instruction to the switching office provides an office equipment number associated with the subscriber.

The service request may relate to a single outgoing call from a line shared by a number of subscribers. Alternatively, a subscriber may call in from any line and request or activate the service with respect to that line for one call or for some period of time. There are also some situations where the network would monitor speech on a line, during usage, to detect if the identified subscriber is still the party using the line.

The personalized service also applies to incoming calls directed to a subscriber. For example, when a subscriber activates a personal dial tone service over a line for some period of time, the network also routes calls for that subscriber to that line during that same period.

Another aspect of the invention relates to personalized incoming call processing, for example where one line and one telephone number are shared by a number of subscribers. The network detects a call to a telephone number associated with a communication link servicing the subscribers. A node of the network, such as the above discussed peripheral, interacts with the caller to identify one of the subscribers intended as the recipient of the call. Profile data corresponding to the identified subscriber is retrieved, preferably using an office equipment number assigned to the subscriber, and the network processes the call in accord with the retrieved profile data.

The profile data can provide a number of subscriber selected features on the incoming call. For example, the profile data may cause an end office switch to ring the shared station using a distinctive ringing signal assigned to the identified subscriber. Persons hearing the distinctive ringing signal know that the call is one for the particular subscriber instead of one of the other persons sharing the communication link. As another example, if the call is not answered or the line is busy, then the network can route the call to the identified subscriber's own voice mailbox.

Advantages of the personal dial tone service should be readily apparent to those skilled in the telecommunications art. For example, in the shared line application, several subscribers can share a single line or communication link as well as a single telephone number. Outgoing call features, however, are personalized to each subscriber. For example, the network can provide each subscriber a different level of service, and each subscriber can receive a separate bill. The service uses speech based identification, eliminating the burden on the subscriber to dial in long strings of identifying digits. As shown by the above discussion of the incoming service, the network only utilizes one number for the subscribers' services, yet the network still provides each subscriber individual incoming call treatment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

In response to each of several types of service requests, the personal dial tone service of the present invention initially identifies the individual subscriber, preferably using a speaker identification/verification procedure. The system then retrieves profile information corresponding to the identified subscriber. The communication network processes one or more calls to or from an identified communication link using the individual subscriber's profile data. On an outgoing telephone call from the subscriber, for example, the service request may be an off-hook signal, and the network may provide 'dial-tone' type telephone services based on the retrieved profile information. In this example, the network may provide a dial tone signal or a customized prompt and then permit the caller to out-dial a call. Calling features and/or billing functions apply based on the profile information, e.g. to bill the call to this one subscriber's personal account. The network may also provide personalized services on incoming calls to the subscriber.

The personal dial tone service may utilize a variety of different networks. For example, the service may be adaptable to Internet based voice communications. The preferred embodiments utilize various implementations of modern telephone networks. To understand the invention, it may be helpful first to consider the architecture and operation of an advanced intelligent network (AIN) type implementation of a public switched telephone network.

Figure 1:
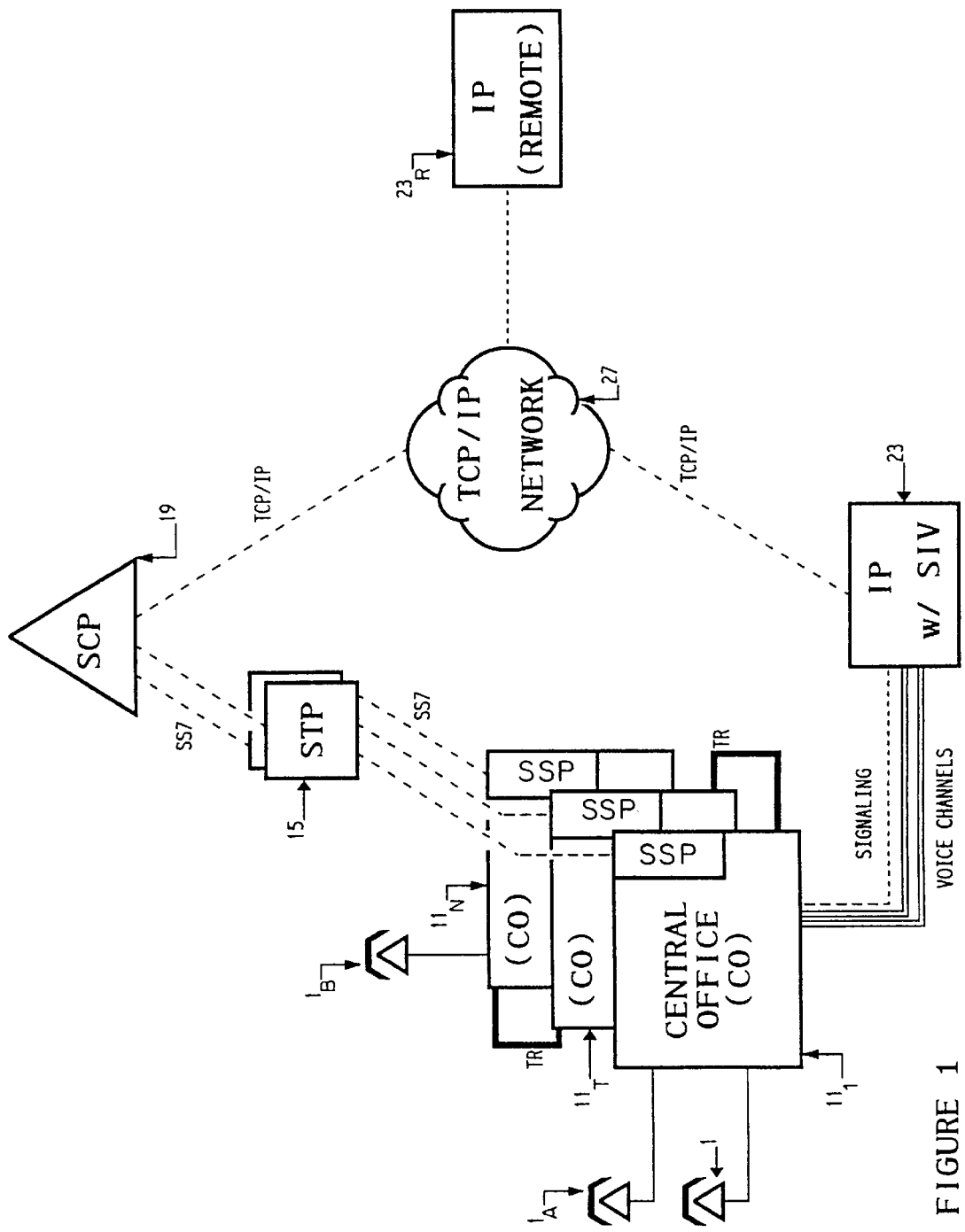
FIG. 1 is a simplified block diagram of an intelligent telephone network that may be used to offer the personal dial tone service of the present invention.

FIG. 1 provides a simplified illustration of the preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network.

The telephone or traffic network (operated by a combination of local carriers and interexchange carriers) includes a number of end office and tandem office type central office switching systems 11. FIG. 1 shows a number of subscriber stations, depicted as telephones 1, connected to a series of central office switches $11_1$ to $11_N$. In the preferred implementation, the connections to the central office switches 11 utilize telephone lines, and the switches are telephone type switches for providing landline communication. However, it should be recognized that other communication links and other types of switches could be used. Trunk circuits (not shown) carry communication traffic between the central office switches 11.

Each end office type central office switch, such as 11 and $11_N$, provides switched telephone connections to and from local communication lines or other subscriber links coupled to end users stations or telephone sets 1. For example, the central office 11 serves as an end office to provide switched telephone connections to and from local communication lines coupled to end users telephone station sets, such as telephone $1_A$, whereas the central office $11_N$ serves as an end office to provide switched telephone connections to and from local communication lines coupled to end users telephone station sets, such as telephone $1_B$.

The typical telephone network also includes one or more tandem switching offices such as office $11_T$ providing trunk connections between end offices. As such, the traffic network consists of local communication links and a series of switching offices interconnected by voice grade trunks, only two examples of which are shown at TR in FIG. 1. One set of trunks TR might interconnect the first end office 11 to the tandem office $11_T$, whereas another set of trunks TR might interconnect the tandem office $11_T$ to another end office $11_N$. Other trunks might directly connect end offices. Although not shown, many offices serve as both end offices and tandem offices for providing different call connections.

FIG. 1 shows connections to the stations 1 via lines, and typically these links are telephone lines (e.g. POTS or ISDN). It will be apparent to those skilled in the art, however, that these links may be other types of communication links, such as wireless links. Also, although shown as telephones in FIG. 1, the terminal devices or stations 1 can comprise any communication device compatible with the local communication link. Where the link is a standard voice grade telephone line, for example, the terminals could include facsimile devices, modems etc. The processing in accord with the invention, however, relies on identification of the subscriber, preferably by voice based recognition. For this purpose, the terminals preferably include two-way voice communication elements.

The lines and trunks through the central offices 11 carry the communication traffic of the telephone network. The preferred telephone network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the preferred embodiment shown in FIG. 1, each central office 11 has at least minimal SS7 signaling capability, which is conventionally referred to as a signaling point (SP) in reference to the SS7 network. As such, the offices can exchanges messages relating to call set-up and tear-down, typically in ISDN-UP format. At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a Service Control Point (SCP) 19 for instructions relating to AIN type services. Central office switching systems having full AIN trigger and query capability are referred to as Service Switching Points (SSPs).

The central office switches 11 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries. A specific example of an SSP capable switch is discussed in detail later, with regard to FIG. 2.

One key feature of the present invention is that the program controlled switch accepts instructions to load profiles and/or receives profiles over a signaling link. In most cases, these profiles are identified by virtual office equipment numbers.

The above described data signalling network between the SSP type central offices 11 and the SCP 19 is preferred, but other signalling networks could be used. For example, instead of the packet switched type links through one or more STP's, a number of central office switches, an SCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from AT&T; and the non-SSP type end offices might be 1A analog type switches.

The SCP 19 may be general purpose computer storing a database of call processing information. In the preferred implementation, the SCP 19 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 19 via a packet switched data network, such as the TCP/IP network 27.

The SCP may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The preferred telephone network also includes one or more intelligent peripherals (IPs) 23 to provide enhanced announcement and digit collection capabilities and speech recognition. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP disclosed from that Patent is incorporated herein in its entirety by reference.

The IP 23 may connect to one or more central offices 11. The connections transport both communication traffic and signaling. The connection between a central office 11 and the IP 23 may use a combination of a T1 and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

As discussed more later, there are certain circumstances in which the SCP 19 communicates with the IP 23. These communications could utilize an 1129 protocol and go through an SSP type central office 11 and the SS7 network. However, in the preferred embodiment of FIG. 1, the IP 23 and the SCP 19 communicate with each other via a separate second signalling network 27. These communications through network 27 between the IP and the SCP may utilize an 1129+ protocol or a generic data interface (GDI) protocol as discussed in the above incorporated Patent to Wheeler, Jr. et al.

The IP 23 can provide a wide range of call processing functions, such as message playback and digit collection. In the preferred system, the IP also performs speaker identification/verification (SIV) on audio signals received from subscribers. Specifically, the IP 23 used for the personal dial tone service includes a voice authentication module to perform the necessary speaker identification/verification function. The IP 23 also includes storage for subscriber specific template or voice feature information, for use in identifying and authenticating subscribers based on speech.

In the simplest form, the IP 23 serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/verification on a particular call. For example, if a remote IP $23_R$ required a template for a subscriber from the region served by the IP 23, the remote IP $23_R$ would transmit a template request message through the network 27 to the IP 23. The IP 23 would transmit the requested template back through the network 27 to the remote IP $23_R$.

In a network such as shown in FIG. 1, routing typically is based on dialed digit information, profile information regarding the link or station used by the calling party and profile information regarding a line or station in some way associated with the dialed digits. Each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch 11. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect and off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as the SCP 19. The SSP capable switching offices initiate such processing upon detection of triggering events. At some point during processing of a telephone call, a central office switching system 11 will recognize an event in call processing as a 'Point in Call' (PIC) which triggers a query to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. In the presently preferred embodiments discussed below, the personal dial tone service utilizes an off-hook immediate trigger, a dialed number trigger and a terminating attempt trigger (TAT), to facilitate different aspects of the service.

In accord with one aspect of the present invention, before providing dial-tone service, the SSP central office 11 that is serving an outgoing call extends the call to the IP 23 providing the speaker identification/verification (SIV) functionality. In the preferred embodiments, this operation involves AIN type call routing to the IP. The IP 23 prompts the caller and collects identifying information, preferably in the form of speech. The IP analyzes the caller's input to identify the caller as a particular subscriber. If successful, the IP signals the SSP to load profile data for that subscriber into the register assigned to the call in the call store. In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, for some service applications.

The call processing by the central office switch 11 utilizes the loaded subscriber profile information. For example, the profile data may indicate specific procedures for billing the call to this subscriber on some account not specifically linked to the originating telephone station or line. For example, in a college dormitory, the billing information might specify billing of a student's calls to the account of the student's parent(s). Any call restrictions, imposed at the wish of the parents, would be reflected in the profile. The switch would restrict the calling services accordingly, e.g. to limit distance, cumulative cost and/or duration of calls.

The inventors also envision use of selected subscriber profile information on incoming calls. When a serving central office SSP 11 detects a call to a line having the personal dial tone service, processing hits a terminating attempt trigger (TAT). The SSP interacts with the SCP 19 and routes the call to the IP 23. The IP 23 prompts the caller to identify a desired called party, e.g. one of the students sharing the dormitory line. Menu announcement together with either digit collection or preferably speech recognition processing by the IP 23 facilitates identification of the desired called party from those associated with the line. Based on identification of the called subscriber, the IP 23 signals the SSP switch 11 to load profile data for that subscriber into the register assigned to the call in the call store. In this case, however, the switch 11 uses selectively loaded profile information for terminating the call. The IP disconnects, and the SSP central office 11 processes the call in accord with the loaded profile information.

For example, the central office 11 may provide a distinctive ringing signal corresponding to the identified subscriber. This service enables distinctive ringing for multiple subscribers on one line without assigning each subscriber a separate telephone number. The loaded profile information may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

The present invention also encompasses a procedure in which a subscriber calls in from a line not specifically designated for personal dial tone service. The network routes the call to the IP 23, and the IP identifies the subscriber and the line from which the subscriber called-in. The subscriber can interact with the IP 23 to have her personal dial tone service associated with that line, either for one call or for some selected period of time. The IP 23 instructs the appropriate central office switch(es) 11 to load profile data associated with the subscriber.

The IP 23 might instruct the end office switch to load the profile data only in the assigned call store register. The switch would use the profile data only for a single call, for example to bill a call from a pay-phone or a hotel room telephone to the subscriber's home account. Alternatively, the IP 23 might instruct the central office 11 serving the line to the calling station 1 to utilize a virtual office equipment number (OE) and associated profile data for all calls to and from that line for some period of time. In this later example, the IP 23 would also instruct the central office 11 serving the line to the subscriber's home station 1 to modify the subscriber's profile to forward calls for the subscriber's telephone number. The modified profile data in the home office 11 would result in forwarding of the subscriber's incoming calls through the office 11 to the selected station 1, for the set period of time.

The present invention relies on the programmable functionality of the central office switches and the enhanced call processing functionalities offered by the IPs. To understand these various functionalities, it may be helpful to review the structure and operation of a program controlled central office and one implementation of an IP. Subsequent description will explain several of the above outlined call processing examples in greater detail.

Figure 2:
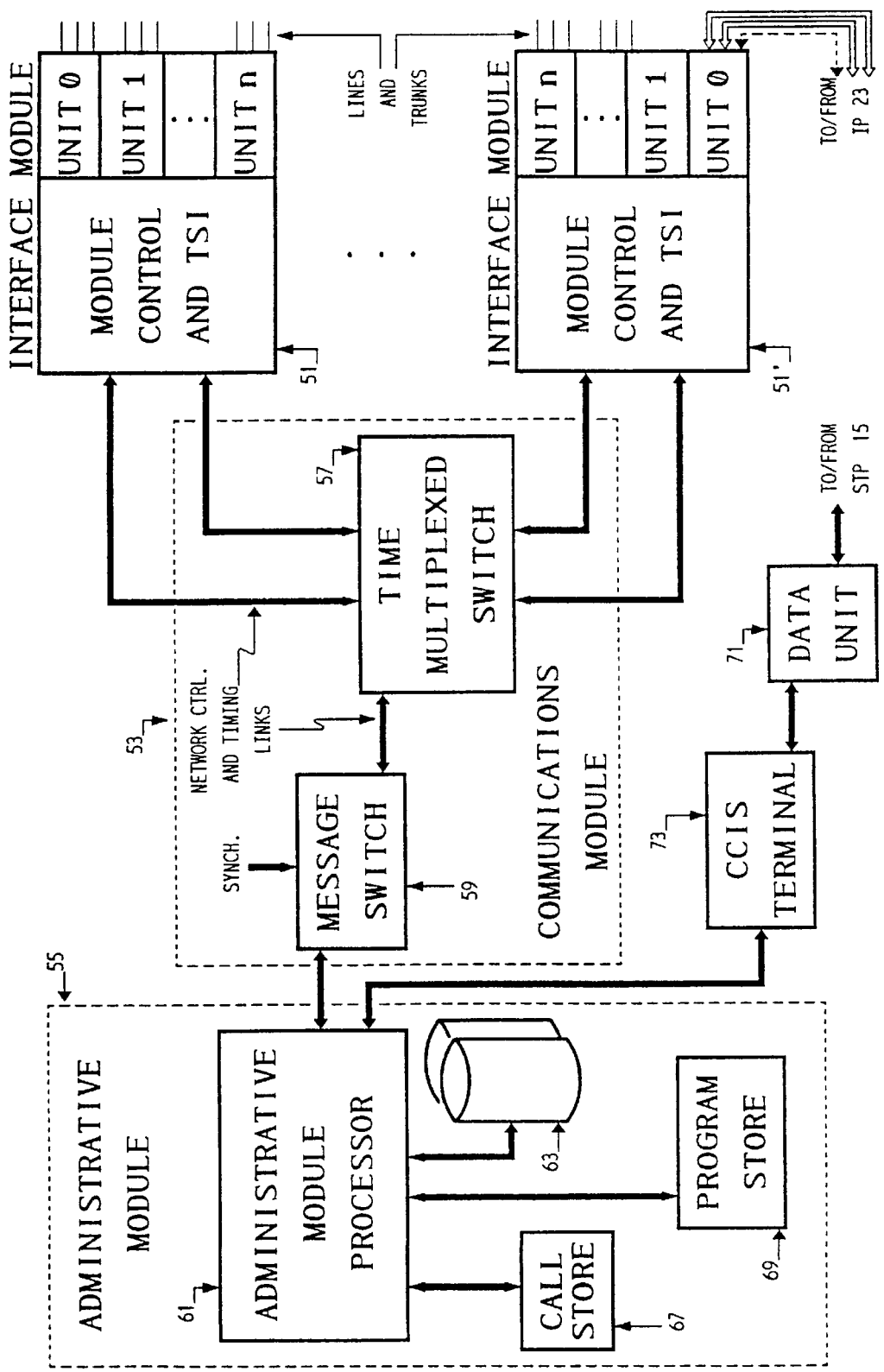
FIG. 2 is a simplified block diagram illustrating the significant functional components of a central office switching system used in the network of FIG. 1.

FIG. 2 is a simplified block diagram of an electronic program controlled switch which may be used as any one of the SSP type central offices 11 in the system of FIG. 1. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multifrequency form.

In the illustrated embodiment, the unit 0 of the interface module 51' provides an interface for the signaling and communication links to the IP 23. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 55. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signalling link between the administrative module processor 61 and one of the STPs 15 (see FIG. 1). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19. The communications between the office 11 and the database systems or the like utilize the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register will receive and store different profile data depending on the particular subscriber associated with any given call. A register is assigned and receives profile data from the disc memory both for originating subscribers on outgoing calls and for terminating subscribers on incoming calls.

Figure 3:
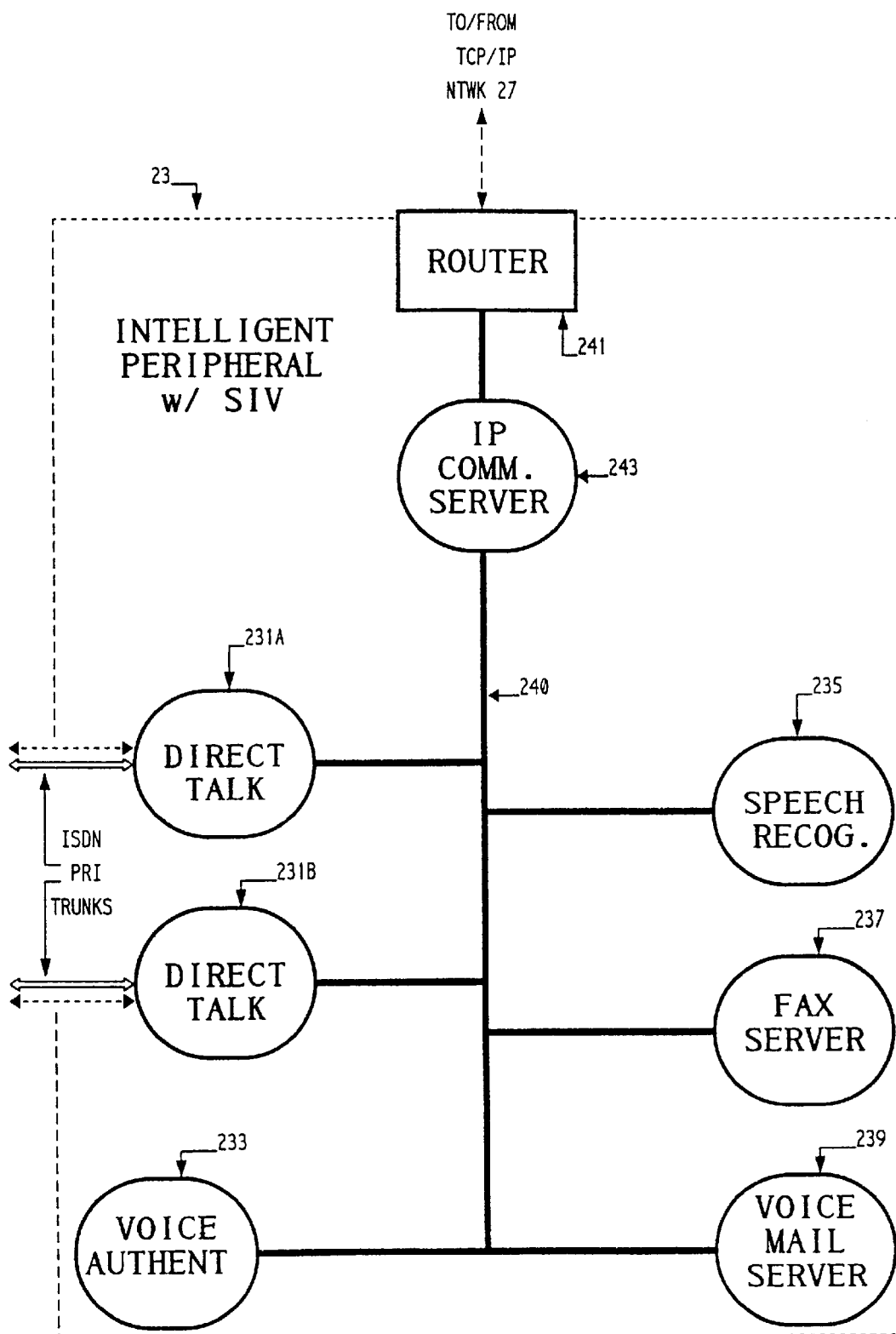
FIG. 3 is a simplified block diagram illustrating the significant functional components of an Intelligent Peripheral (IP) used in the network of FIG. 1.

A variety of adjunct processor systems known in the telephone industry can be used as the IP 23. The critical requirements are that the IP system process multiple calls and perform the subscriber identification functions, preferably by speaker identification and authentication. FIG. 3 is a functional diagram illustration of an IP 23 for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office 11. Separate modules 233, 235 perform voice authentication and speech recognition. The IP 23 includes a variety of additional modules for specific types of services, such as a server module 237 for fax mail, and another server 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also include an interface card for providing two-way communications over the internal data communications system 240.

The voice processing cards in the Direct Talk modules 231A, 231B provide voice message transmission and dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module may play an announcement from memory, e.g. to prompt a caller to say their name. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller.

The illustrated IP also includes a communication server 243. The communication server 243 connects between the data communication system 240 and a router 241 which provides communications access to the TCP/IP network 27 that serves as the second signaling communication system. The communication server 243 controls communications between the modules within the IP and the second signaling communication system. The server 243 and the router 241 facilitate communication between the elements of the IP 23 and the SCP 19. The IP may also use this communication system to communicate with other IP's, for example to send subscriber voice template information to the remote IP 23, (FIG. 1) or to receive such information from that IP or some other network node.

The personal dial tone service relies on the voice authentication module 233 to perform the necessary speaker identification/verification function. For the identification and authentication of subscribers, the voice authentication module 233 within the IP 23 stores a template or other feature or voice pattern information for each person who has the personal dial tone service in the area that the IP services. For example, if the subscriber utilizes the personal dial tone service from a particular line, such as a shared line in a dormitory or the like, the IP stores the subscriber's voice pattern information in a file associated with the office equipment (OE) number of the particular line. If the IP 23 serving a call does not store the template or feature data for a particular subscriber, the IP 23 may obtain subscriber identification by dialed digit input and then obtain a copy of the template or feature data from a remote IP $23_R$ via communication through the TCP/IP network 27, in order to authenticate the subscriber's identity.

Using current technology, a new subscriber would get on line with the IP serving that subscriber and 'train' that IP by speaking certain phrases. From the received audio signals representing those phrases, the IP would store templates or other pattern information for use in identifying and/or verifying that a caller is the particular subscriber.

During actual call processing, the voice authentication module 233 receives speech information from the caller. The voice authentication module 233 compares the received information to its stored template or feature data to identify a calling party as a particular subscriber.

The present invention also relies on the speech recognition capability of the module 235, particularly in processing of incoming calls in certain situations. The speech recognition module 235 enables the IP to analyze incoming audio information to recognize vocabulary words. The IP 23 interprets the spoken words and phrases to determine subsequent action. For example, the IP might recognize the caller speaking the name of a called subscriber and use the subscriber identification to instruct the terminating central office to control the call in accord with that subscriber's profile.

The preferred routing of the calls in accord with the invention utilizes AIN type call processing. To understand the call processing, it may be helpful to consider several specific examples in more detail.

Figure 4:
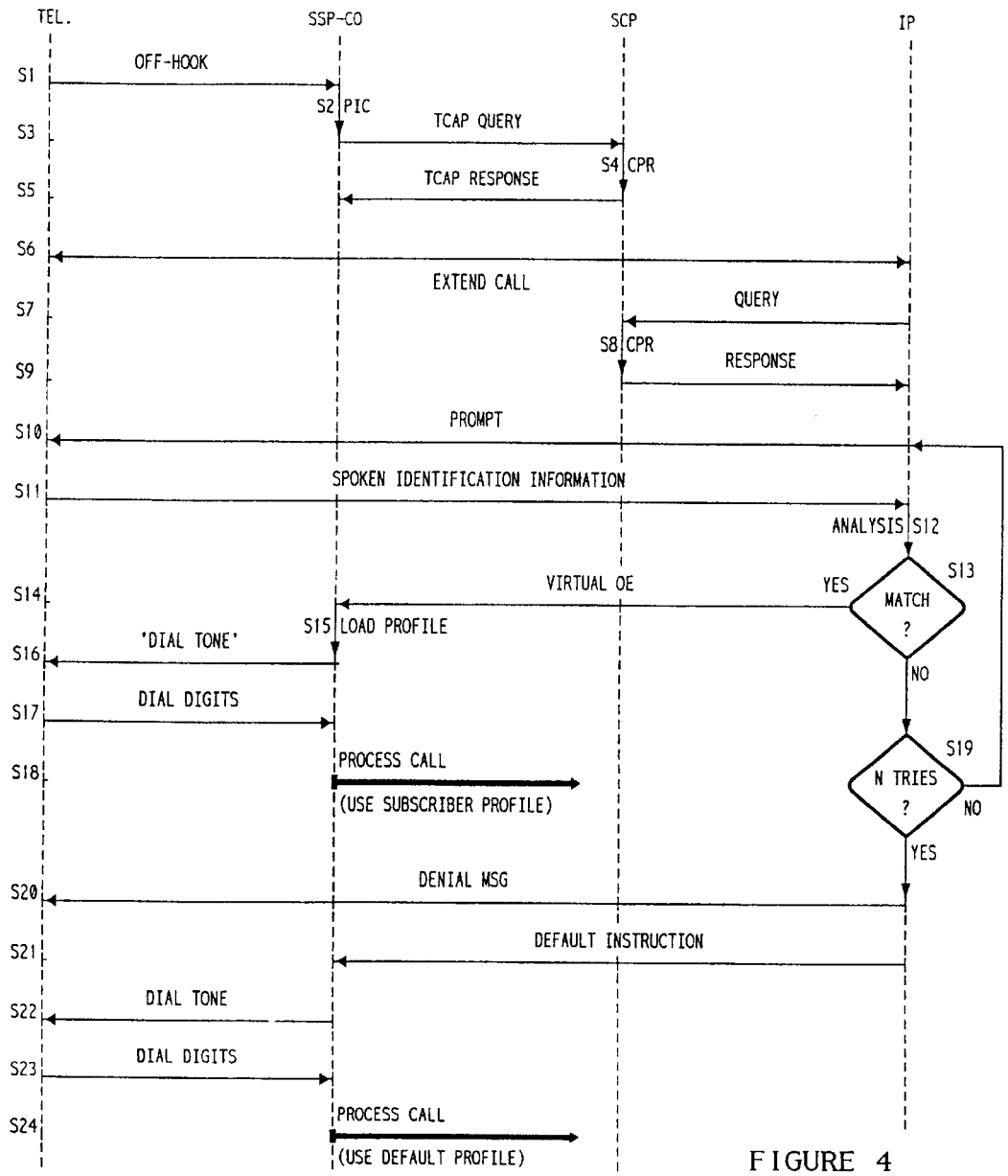
FIG. 4 is a combination signal flow and process flow diagram useful in understanding a specific example of call processing for providing the personal dial tone service over a shared use line.

In a first example, consider an outgoing call from the station $1_A$ to the station $1_B$. Assume per call assignment of profile data to the originating line, for personal dial tone service on each outgoing call. FIG. 4 provides a simplified flow diagram of the signal flow and processing for such an outgoing call.

Assume use of a standard telephone for purposes of this example. The person lifts the handset creating an off-hook state in the telephone and a corresponding signal or change in state on the line to the central office 11 (step S1). In this call flow, the off-hook signal is a type of service request, i.e. a request to make an outgoing call. The serving central office $11_1$ detects the off-hook and commences its call processing. Specifically, the central office assigns a register in the call store 67 to this call and loads profile information associated with the off-hook line from the disc storage 63 into the assigned register. In this case, the central office $11_1$ is an SSP capable office, and the loaded profile data indicates an off-hook immediate trigger set at against the particular line. The serving SSP type office $11_1$ therefore detects this off-hook PIC as an AIN trigger (step S2).

In response to the off-hook and the off-hook trigger set in the subscriber's profile, the SSP type central office switch $11_1$ launches a query to the SCP 19 (step S3). Specifically, the SSP $11_1$ creates a TCAP query message containing relevant information, such as the office equipment (OE) number assigned to the off-hook line, and transmits that query over an SS7 link to one of the STPs 15. The query includes a destination point code and/or a global title translation addressing the message to the SCP 19, and the STP 15 relays the query message over the appropriate link to the SCP 19. The query from the SSP central office $11_1$ identifies the caller's line by its associated office equipment (OE) number and possibly by a single telephone number associated with the off-hook line.

In response to a query, the SCP 19 accesses its a database, typically, the MSAP database set up in the ISCP, to determine how to process the particular call. The SCP 19 identifies an access key in the query and uses the key to retrieve the appropriate record from the database. In this case, the query indicates an off-hook trigger as the trigger event, therefore the SCP 19 uses the calling party office equipment (OE) number as the access key. The SCP 19 retrieves a call processing record (CPR) corresponding to the office equipment (OE) number associated with the off-hook line and proceeds in accord with that CPR (step S4).

For the example of the personal dial tone service, the CPR will provide information necessary for routing the call to some node of the network that will perform speaker identification/verification (SIV). In the preferred embodiment, the SIV is a function performed by an Intelligent Peripheral (IP), therefore the CPR provides information for routing the call to the nearest available IP having the SIV capability.

Based on the CPR, the SCP 19 formulates a response message instructing the SSP central office $11_1$ serving the customer to route the call. In this case, the message includes information, e.g. a office equipment (OE) number or telephone number, used for routing a call to the identified IP. The SCP 19 formulates a TCAP message in SS7 format, with the destination point code identifying the SSP office $11_1$. The SCP 19 transmits the TCAP response message back over the SS7 link to the STP 15, and the STP 15 in turn routes the TCAP message to the SSP central office $11_1$ (see step S5).

The SSP type switch in the central office $11_1$ uses the routing information to connect the call to one of the lines or channels to the IP 23. A two-way voice grade call connection now extends between the calling station $1_A$ and the IP 23 (step S6). In the present example, the switch actually connects the off-hook line to the line to the IP before providing dial tone.

As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and possibly the telephone number for that line.

In response to the incoming call, the IP 23 will seize the line, and it will launch its own query to the SCP 19 (step S7).

In the preferred network illustrated in FIG. 1, the IP 23 and the SCP 19 communicate with each other via a separate second signalling network 27, for example utilizing either an 1129+ protocol or a generic data interface (GDI) protocol as discussed in U.S. Pat. No. 5,572,583 to Wheeler, Jr. et al. The query from the IP 23 again identifies the caller's line by at least its associated office equipment (OE) number.

In response to the query from the IP 23, the SCP 19 again accesses the appropriate CPR (step S8) and provides a responsive instruction back through the network 27 to the IP 23 (step S9). Although the IP 23 could passively monitor any speech that the user might utter, the preferred implementation utilizes a 'Challenge Phase' to prompt the user to input specific identifying information. In this case, the instruction causes the IP 23 to provide a prompt message over the connection to the caller (step S10). Here, the signal to the caller may be a standard dial tone or any other appropriate audio signal. Preferably, the instruction from the SCP 19 causes the IP 23 to provide an audio announcement prompting the caller to speak personal information. In one preferred example, in step S10 the IP plays an audio prompt message asking the caller, 'Please say your full name'. The process may ask for any appropriate identifying information.

The signal received by the IP 23 goes over the lines and through the central office switch(es) for presentation via the off-hook telephone $1_A$ to the calling party. In response, the caller will speak identifying information into their off-hook telephone, and the network will transport the audio signal to the IP 23 (step S11).

As noted above, an IP 23 can provide a wide range of call processing functions, such as message playback and digit collection. In the preferred system, the IP also performs speaker identification/verification (SIV) on the audio signal received from the off-hook telephone in step S11. When the IP 23 receives speech input information during actual call processing, for this service example, the IP analyzes the speech S12 to extract certain characteristic information (step S12).

The IP 23 stores a template or other voice pattern information for each person who has the personal dial tone service in the area that the normally IP services. If the IP 23 does not store the particular template or feature information it needs to process a call, the IP 23 can communicate with a remote IP $23_R$ to obtain that information. In the present shared line example, the IP 23 will store template or feature data for each subscriber associated with the particular off-hook line.

When the IP 23 receives input speech and extracts the characteristic information during actual call processing, the IP compares the extracted speech information to stored pattern information, to identity and authenticate the particular caller. In the present example, the voice authentication module 233 in the IP 23 compares the extracted speech information to the stored template or feature data for each subscriber associated with the particular off-hook line.

In step S13, the IP 23 determines if the information extracted from the speech input matches any of the stored template data feature data for an identifiable subscriber (within some threshold level of certainty). If there is a match, the IP now knows the identity of the calling subscriber. Based on the identification of the calling subscriber, the IP 23 selects a virtual office equipment (OE) number from storage that corresponds to the subscriber.

The IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link (step S14). In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register (step S15). Specifically, the administrative module processor 61 retrieves profile information associated with the virtual office equipment (OE) number from the disc storage 63 into the register. As such, the profile information in the assigned register in the call store 67 now corresponds to the identified subscriber, rather than to the off-hook line.

The profile information provides a wide range of data relating to the subscriber's services. The profile data provides necessary billing information, enabling billing from the call to this particular subscriber. The profile also defines various service features available to this subscriber on outgoing calls, such as three-way calling. The profile may define a class of calling service available to the subscriber. In the dormitory example, the caller may be allowed a set dollar amount for long distance calls per month (e.g. $50.00). The profile data will indicate the remaining amount at the time of the call and will cause the switch to interrupt service when the available amount is exhausted. Other class of service restrictions might enable long distance calls only if collect and/or only if calling one or two specified numbers (e.g. only to the parents' house). The class of service might enable only long distance calls within a region or country but not international calls.

In the presently preferred implementation, when the central office switch $11_1$ reloads the profile, the central office disconnects the link to the IP 23 and connects tone receivers to the caller's line. Optionally, the central office $11_1$ may provide a 'dial tone' or other message over the line (step S16). The caller now dials digits in the normal manner (step S17), and the switch in the central office $11_1$ loads the dialed digits into the assigned register within the call store 67. The central office $11_1$ utilizes the dialed digits and the subscriber's profile data to process the call (S18). For example, if the dialed digits represent a call within the subscriber's permitted class of service, the switch completes the call to the destination station $1_B$ using the dialed digits in the normal manner. If the profile data requires a particular billing treatment, e.g. to bill a long distance call to the subscriber, the switch makes the appropriate record and forwards the record to the exchange carrier company's accounting office equipment.

In the shared line example, each person normally expected to use the line to station $1_A$ is a different subscriber to the personal dial tone service. As the subscribers make outgoing calls, they each receive their own individualized service over the line on each separate call, in precisely the manner described above relative to steps S1 to S18. For example, each subscriber may receive a different level of calling privileges and/or class of service based on their ability and/or desire to pay for telephone services.

Returning to step S13, the extracted information characterizing the input speech signals may not match any of the templates or feature data used by the IP 23. In this event, the process flows to step S19. The IP will count the number of tries or attempts to identify the subscriber and permit some maximum number of failed attempts (N). Assume, for example, that the software allows only two identification attempts on one call (N=2). On the first failure, the number of tries is less than N, therefore processing returns to step S10, and the IP 23 again transmits the prompt for speech input. The caller again speaks the requested input information (S11), and the authentication module 233 again analyzes the input information (S12). If the second input adequately matches a stored subscriber's information in step S13, the processing flows through steps S14 to S18 to complete the call as described above.

However, if the extracted speech information does not match a stored subscriber template or feature data, processing again flows to step S19. If the number of tries now corresponds to the limit N, for example on the second failed attempt, the processing branches to step S20. The IP 23 may now transmit a message indicating denial of service, although this is optional. If provided, the message states that only a limited class of service is available in view of the problems in recognizing the caller as a known subscriber.

The IP 23 formulates a D-channel signaling message instructing the central office switch $11_1$ to process the call in accord with default conditions and transmits that instruction to the central office switch (step S21). The instruction could include a default OE number corresponding to a default profile or the message could instruct the switch to proceed using the OE and profile data for the off-hook line itself. The IP 23 supplies the message to the SSP central office switch $11_1$ over the D-channel of the ISDN PRI link (step S21). The administrative module processor 61 resumes call processing using the appropriate default OE and profile.

In the preferred embodiment, the switch provides a normal dial tone (S22), collects dialed digits from the caller (S23) and processes the call (S24). However, the default profile provides only some limited class of service, for example only emergency 911 service or 911 service plus flat rate local calling.

In the above example, the network disconnected the IP 23 after identifying the subscriber and providing the subscriber's virtual OE number to the serving central office 11. For some applications of the personal dial tone service, the central office 11 would maintain a bridged connection of the IP 23 on the line, to enable the IP to monitor the call. For example, in a prisoner telephone service, each prisoner would have only limited telephone rights as specified in each prisoner's profile data. To prevent one prisoner from selling their telephone service rights to another prisoner, the IP 23 would periodically or constantly monitor the outgoing speech signals from the prison line. The voice authentication module 233 would initially identify the prisoner subscriber as discussed above, and would periodically recheck to authenticate the identity of the party using the prison line. If the voice authentication module detects some other party using the line or did not detect the identified subscriber's speech for some predefined time interval, the IP 23 would instruct the serving central office switch 11 to disconnect the call. The IP 23 may send messages to the switch or to other network elements to initiate additional action, such as profile modification to further limit a particular prisoner's telephone privileges and/or to notify prison authorities of misuse of telephone privileges.

The first detailed example discussed above related to personal dial tone service provided on a per-call basis on a shared use line. Several known subscribers might routinely use their personal dial tone service over the same line. As noted earlier, an alternate form of the personal dial tone service can be activated on a dial-up basis. Consider now an example of a dial-up activation for a single call.

Figure 5:
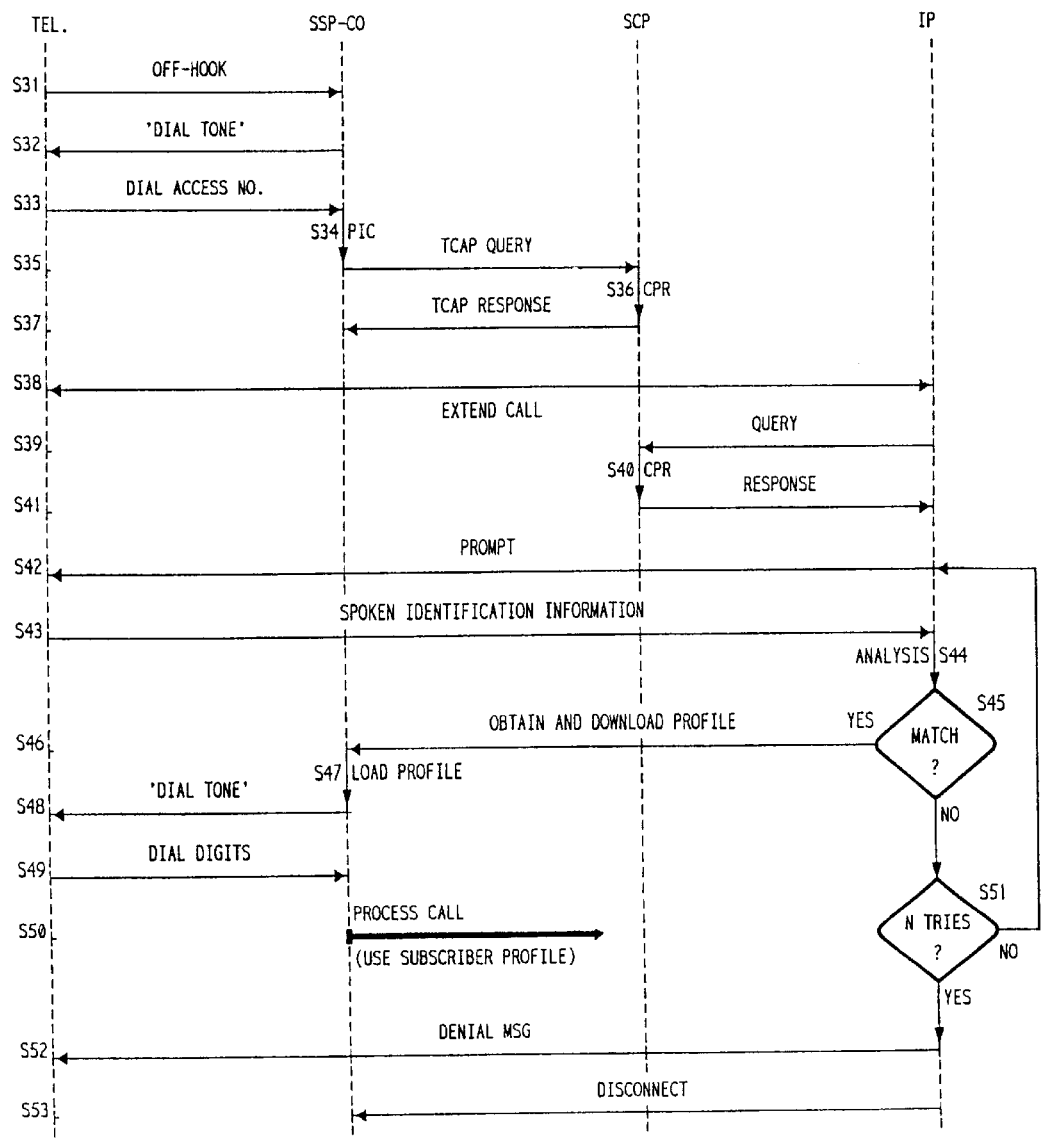
FIG. 5 is a combination signal flow and process flow diagram useful in understanding a specific example of call processing for providing the personal dial tone service on a dial-up, per call basis.

For this example, assume that a subscriber's normal or 'home' telephone is telephone $1_B$. The end office switch $11_N$ stores the subscriber profile data for the line associated with that telephone station. Now assume that the subscriber is using station $1_A$ connected through a telephone line to central office $11_1$. FIG. 5 provides a simplified flow diagram of the signal flow and processing for such a call.

The subscriber lifts the handset creating an offhook state in the telephone $1_A$ and a signal to office 11 (step S31). The serving central office $11_1$ detects the off-hook and commences its call processing. Specifically, the central office assigns a register in the call store 67 to this call and loads profile information associated with the off-hook line from the disc storage 63 into the register. In this case, the profile data associated with the line does not provide an off-hook trigger because the line is not specifically associated with the shared use type personal dial tone service discussed above. The central office $11_1$ therefore provides dial tone in the normal manner (step S32).

If making a normal call, the caller would dial a destination number, and the network would complete the call as dialed. To activate the personal dial tone service, however, the subscriber dials an access number assigned to that service, such as 1-800-DIALTON, from the station $1_A$ (step S33).

The dialing of an outgoing call, in this case to the access number, is another type of service request. The central office switch $11_1$ recognizes the dialed number as a trigger event or 'PIC' (step S34). The SSP type central office $11_1$ creates a TCAP query message containing relevant information, such as the office equipment (OE) number and/or telephone number assigned to the off-hook line, the dialed number and the type of triggering event. The office $11_1$ transmits that query to the SCP 19 (step S35). Specifically, the SSP central office $11_1$ transmits the query over an SS7 link to one of the STPs 15. The query includes a point code and/or a global title translation addressing the message to the SCP 19, and the STP 15 relays the query message over the appropriate link to the SCP 19.

In response to a query, the SCP 19 accesses its database to determine how to process the particular call. In this case, the query indicates the dialed number type trigger and provides the digits of the specific number dialed. The SCP 19 uses the dialed number as the access key. The SCP 19 retrieves a call processing record (CPR) corresponding to that number associated with the personal dial tone access function (step S36). For the current exemplary access, the CPR will provide information necessary for routing the call to the IP 23 that will perform the necessary speaker identification/verification (SIV).

Based on the CPR, the SCP 19 formulates a response message instructing the SSP central office $11_1$ serving the customer to route the call. In this case, the message includes information, e.g. a office equipment (OE) number or telephone number, used for routing a call to the identified IP. The SCP 19 formulates a TCAP response in SS7 format and transmits the TCAP response message back to the SSP central office $11_1$ (see step S37).

The SSP type switch in the central office $11_1$ uses the routing information to connect the call to a line or channel to the IP 23. A voice grade call connection now extends between the calling station $1_A$ and the IP 23 (step S38).

The central office $11_1$ provides a signaling message to the IP 23 with the call. In this case, the signaling message includes the dialed digits indicating a call to the personal dial tone access number. The signaling message also includes either the office equipment number or the telephone number of the line to the calling station $1_A$.

As in the earlier example, the IP 23 will seize the line for the incoming call and launch a query to the SCP 19 through the TCP/IP network 27 (step S39). The SCP 19 accesses an appropriate CPR (S40), and based on that CPR, the SCP 19 transmits back a message (S41) instructing the IP 23 to execute a program or script for the dial-up access to the personal dial-tone service.

The IP initially plays a greeting and a prompt message (S42) and collects spoken input information (S43). The IP 23 may also play a prompt and collect digits representing the subscriber's normal or home telephone number. The voice authentication module 233 analyzes the spoken identification information to extract characteristic information (S44) and compares the extracted information to stored template or feature data to determine if there is an adequate match to the known subscriber data (S45), as in the earlier example.

In step S45, the IP 23 determines if the information extracted from the speech input matches any of the stored template data feature data for an identifiable subscriber. If there is a match, the IP now knows the identity of the calling subscriber. Based on the identity of the subscriber, the IP 23 obtains the subscriber's profile data from the central office $11_N$ serving the subscriber's home telephone line. If the IP 23 is in direct signaling communication with the home central office $11_N$, for example via an ISDN D-channel or an SMDI link, the IP 23 may directly request and receive the profile data over the signaling link. If the IP and the switch are not in direct communication, the IP may provide a message notifying the SCP 19, and the SCP 19 would obtain the data from the switch and provide it back to the IP 23.

The IP 23 formulates a D-channel signaling message containing the subscriber's profile information together with an instruction to load that information into the register assigned to the call in place of the profile information corresponding to the off-hook line (step S46). The IP 23 supplies the message to the SSP central office switch $11_1$ over the D-channel of the ISDN PRI link. In response, the administrative module processor 61 rewrites the profile data in the register assigned to the call using the data from the IP 23 (step S47). As such, the profile information in the assigned register now corresponds to the identified subscriber.

When the central office switch $11_1$ reloads the profile, the central office disconnects the link to the IP 23 and connects tone receivers to the caller's line. The central office $11_1$ may also provide a standard dial tone or other message over the line (step S48). The caller can now dial digits in the normal manner (step S49), and the switch in the central office $11_1$ will load the dialed digits into the assigned register within the call store 67. The central office $11_1$ utilizes the dialed digits and the subscriber's profile data to process the call (step S50). For example, the switch in central office $11_1$ may provide the appropriate record to bill the outgoing call to the subscriber's account.

As in the earlier example, the preferred embodiment allows up to N tries or attempts to provide recognizable subscriber identification information. Thus, if in step S45 the extracted information characterizing the input speech signals did not match any of the templates or feature data used by the IP 23, then the process flows to step S51. If the current number of attempts for recognition on this call is less than N, processing returns to step S42, and the IP 23 again transmits the prompt for speech input. The caller again speaks the requested input information (S43), and the authentication module 233 again analyzes the input information (S44). If the second input adequately matches a stored subscriber's information S45, the processing flows through steps S46 to S50 to complete the call as described above.

However, if the extracted speech information does not match a stored subscriber template or feature data, processing again flows to step S51. If the number of tries now corresponds to the limit N, the processing branches to step S52. The IP 23 preferably transmits a message indicating denial of service (S52), and then transmits a message to the central office $11_1$ signifying disconnection of the access call (S53). It should be noted that, in this example, normal service provided over the line to station $1_A$ is available on a subsequent call. The failure to recognize the caller as a personal dial tone subscriber only prevents the caller from using the personal dial tone services of a subscriber to that service, for example specialized billing of calls to that subscriber's account instead of to the account normally associated with the line to the calling station $1_A$.

In the above discussed dial-up access example, the dial tone service was personalized for a single outgoing call by temporarily loading the subscriber's profile data into the register assigned to the outgoing call in the originating central office $11_1$. The system can provide such service to the subscriber over any line or to any telephone station, including pay telephone stations.

The present invention also enables activation of the personal dial tone service on a particular line for some predetermined period of time, for example to enable use of office or business services from some remote location while a business subscriber is out of the office. This type of operation involves an activation call requesting the service on a particular line for the desired period. Consider now an example of such a time activated service.

For this example, assume that a subscriber's normal business telephone is telephone $1_B$. The end office switch $11_N$ stores the subscriber profile data for the line associated with that telephone station. Now assume that the subscriber is using station $1_A$ connected through a telephone line to central office $11_1$ for business related communication services. The business related communication services include both incoming call related services and outgoing call related services.

To activate the personal dial tone service, the subscriber again lifts the handset at station $1_A$, receives dial tone from the central office $11_1$ and dials the access number assigned to that service. The network uses AIN type processing to route the call to the IP 23, as in the example discussed above relative to FIG. 5.

As in the earlier examples, the IP 23 seizes the line for the incoming call and launches a query to the SCP 19 through the TCP/IP network 27. The SCP 19 transmits back a message instructing the IP 23 to play a greeting and a prompt message and collect and analyze spoken input information to identify and authenticate the subscriber. The instruction from the SCP 19 also causes the IP 23 to prompt the subscriber and obtain input information regarding the time period for service activation and possible to obtain digits representing the subscriber's normal business telephone number. The process of calling the access number and interacting with the IP to activate the personal dial tone service on a line for the desired period is another type of service request.

For outgoing call processing, the IP 23 signals the central office $11_1$ serving the line to station $1_A$ to set an off-hook trigger in the profile data associated with that line. The IP also obtains the profile information from the switch $11_N$ serving the station $1_B$ and provides that information together with a virtual OE number to the central office $11_1$. The office $11_1$ stores the profile in its disc memory 63 in such a manner that the switch in that office can use the virtual OE number to retrieve that subscriber's profile. For incoming calls to the subscriber, the IP 23 transmits a signaling message to the subscriber's home office $11_N$ to set a terminating attempt trigger (TAT) against the line to the subscriber's office telephone $1_B$.

The IP 23 also transmits a message through the TCP/IP network 27 to the SCP 19 advising the SCP 19 of the service activation. This message identifies the subscriber, for example by their normal telephone number and identifies the telephone number and office equipment (OE) number associated with the line to station $1_A$ that the subscriber selected for their personal dial tone service.

In response to the message from the IP 23, the SCP 19 now establishes or modifies two CPRs for this subscriber. One CPR controls processing of calls to the subscriber's normal business telephone number to enable routing to the station $1_A$, and the other controls routing of outgoing calls from that station to the IP 23 for speaker identification/verification (SIV) processing.

Subsequently, when there is an outgoing call from the station $1_A$, the network will route the call to the IP 23 to determine if the caller is the subscriber or some other party, exactly as discussed in the per-call service from a shared use line (FIG. 4). As in that earlier example, if the IP identifies the caller as the personal dial tone subscriber, then the IP 23 provides the virtual OE to enable loading of subscriber's profile from disc memory 63. However, if the IP determines that the caller is not the personal dial tone subscriber, the IP instructs the originating office $11_1$ to simply provide dial tone and complete the call in the normal manner. The central office 11 therefore will utilize the office equipment (OE) number and profile information normally associated with the line, instead of those for the personal dial tone subscriber. In this manner, it is quite easy for the personal dial tone subscriber and the normal subscriber to both obtain their desired services on their respective calls via the same line.

The trigger set against the subscriber's normal telephone number and establishment of the CPR in the SCP 19 enables redirection of calls normally intended for the subscriber's business telephone $1_B$ to the line to station $1_A$. Depending on how the subscriber elects to define their individual service, the network may simply route the calls to the line to station $1_A$, as a normal AIN forwarded call that simply rings the station(s) $1_A$ on the line. Alternatively, the subscriber may elect an enhanced service which involves routing to the IP, IP prompting and speech recognition to identify the called subscriber and distinctive ringing over the line, in a manner analogous to that used for processing incoming calls in shared use applications, such as the above discussed dormitory example.

As noted above, the dial-up access procedure in this latest service example required the subscriber to specify a time period that the personal dial tone service should apply to the particular line. The IP 23 stores a record of the time period elected by the subscriber. When the period expires or if the subscriber calls in earlier to change the service to another line or temporarily cancel the service, the IP 23 will provide cancellation notices to the appropriate central offices 11 and to the SCP 19. In the example, the IP 23 will notify the office 11 to cancel the off-hook trigger set against the line to station $1_A$ and to delete the subscriber's virtual OE number and profile from its disc memory. The IP 23 will also instruct the central office $11_N$ to cancel the terminating attempt trigger set against the subscriber's business line to station $1_B$. The notice to the SCP 19 causes the SCP to deactivate the personal dial tone CPR and the call redirection CPR.

The subscriber can then or later interact with the IP 23 to establish time based temporary personal dial tone service through another line or location, as discussed above. In this manner, a subscriber might set up a temporary office in a motel in one city for several days. The subscriber might cancel the service while in transit to a new location. Then the subscriber might reestablish the service to set up a temporary office service at a vacation home for a week.

The time based personal dial tone service could be modified in several manners. For example, the subscriber might establish a file for use by the SCP or the IP to establish the personal dial tone service at two or more locations at specified times, e.g. at the office during office hours and at a home office during other hours. Also, the above example of this service relied on downloading the subscriber' profile into the switch serving the line with which the subscriber is temporarily associated. Alternatively, the IP could obtain the profile from the subscriber's home switch and provide the profile to the serving switch as part of the processing of each outgoing call by the subscriber from that line during the specified time period.

A preferred network implementation and a number of specific call processing routines have been discussed above by way of examples relating to the present invention. However, the preferred embodiment of the invention is amenable to a variety of modifications.

For example, the preferred embodiment described above utilizes speaker identification/verification to recognize the identity of a calling subscriber. Where such capabilities are not available, the system could use an announcement and digit process, for example to obtain an account number and a personal identification number (PIN).

Also, the currently preferred embodiment utilizes AIN routing to the IP and speaker identification/verification elements within the IP to identify the subscriber for profile selection. As speaker identification/verification equipment becomes more readily available, cheaper and more compact, it will be possible to build this functionality into the line cards of the end office switches. The switch itself will challenge the caller, analyze spoken information and identify the subscriber to select the appropriate profile, without routing to an IP or the like.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A telecommunication network comprising:
   a central office for processing calls originated over a plurality of communication links, said central office including mass storage containing subscriber profiles for a plurality of subscribers each having an individually assigned office equipment number; and
   a peripheral coupled to the central office, said peripheral including a voice authentication module for analyzing speech of a caller from one communication link to identify the caller as one of the subscribers and provide an office equipment number assigned to the identified subscriber to the central office, wherein the central office retrieves one of the subscriber profiles, which corresponds to the office equipment number assigned to the identified subscriber. and processes at least one call over a communication link using the retrieved profile.

2. A network as in claim 1, further comprising:

a service control point, remote from the central office, said service control point containing a database of call processing records for controlling at least some services provided through the central office; and a first signaling network separate from the communication links for carrying signaling messages between the service control point and the central office.

3. A network as in claim 2, wherein the peripheral includes a communication server facilitating signaling communication between the peripheral and the service control point.

4. A network as in claim 3, further comprising a second signaling network, separate from the communication links and the first signaling network coupled between the communication server and the service control point.

5. A network as in claim 4, wherein the peripheral stores characteristic voice feature data relating to the plurality of subscribers for comparison to characteristic data extracted from the speech of the caller.

6. A network as in claim 5, further comprising a remote peripheral storing characteristic voice feature data relating to another plurality of subscribers, wherein the remote peripheral is coupled to the second signaling network for communication of stored characteristic voice feature data.

7. A network as in claim 1, wherein the peripheral stores characteristic voice feature data relating to the plurality of subscribers for comparison to characteristic data extracted from the speech of the caller.

8. A telecommunication network comprising:

a plurality of central office switching systems interconnected by trunk circuits, for processing calls originated over a plurality of communication links, each of said central office switching systems including mass storage containing subscriber profiles for a plurality of subscribers each having an individually assigned office equipment number; and a peripheral coupled to at least one of the central office switching systems for interacting with a caller to identify the caller as one of the subscribers, said peripheral providing an office equipment number assigned to the identified subscriber to one or more of the central office switching systems, wherein in response to receipt of the office equipment number, a central office switching system retrieves a corresponding profile and processes at least one call over a communication link using the retrieved profile.

9. A network as in claim 8, wherein the central office switching systems comprise telephone switches.

10. A network as in claim 9, wherein at least some of the communication links comprise telephone lines.

11. A network as in claim 9, further comprising:

a service control point, remote from the telephone switches, said service control point containing a database of call processing records; and a first signaling network separate from the communication links and trunk circuits for carrying signaling messages between the service control point and the telephone switches.

12. A network as in claim 11, wherein the peripheral includes a communication server facilitating signaling communication between the peripheral and the service control point.

13. A network as in claim 12, further comprising a second signaling network, separate from the communication links, the trunk circuits and the first signaling network coupled between the communication server and the service control point.

14. A network as in claim 13, wherein the peripheral stores characteristic voice feature data relating to the plurality of subscribers, and the peripheral comprises a voice authentication module for comparing characteristic data extracted from speech of the caller to the stored characteristic voice feature data.

15. A network as in claim 14, further comprising a remote peripheral storing characteristic voice feature data relating to another plurality of subscribers, wherein the remote peripheral is coupled to the second signaling network for communication of stored characteristic voice feature data.

16. A network as in claim 13, wherein:

the first signaling network comprises a common channel interoffice signaling network coupled to the telephone switches; and the second signaling network comprises a packet switched data network.

17. A network as in claim 16, wherein:

the common channel interoffice signaling network utilizes signaling system 7 (SS7) protocol; and the packet switched data network utilizes transmission control protocol/Internet protocol (TCP/IP).

18. A network as in claim 8, wherein the peripheral comprises a voice authentication module for analyzing speech received from the caller to identify the caller as an authentic subscriber.

19. A telecommunication network comprising:

a plurality of central office switching systems interconnected by trunk circuits, for processing calls originated over a plurality of communication links, each of said central office switching systems including mass storage containing subscriber profiles for a plurality of subscribers; and a peripheral coupled to at least one of the central office switching systems during processing of a call, said peripheral including a voice authentication module for analyzing speech of a caller from one communication link to identify the caller as one of the subscribers and provide an instruction to one or more of the central office switching systems based on the identity of the one subscriber, wherein in response to receipt of the instruction, a central office switching system processes the call using one of the subscriber profiles corresponding to the identity of the one subscriber.

20. A telephone central office switching system comprising:

interface units for coupling to a plurality of communication links;

a switch fabric for providing selective communication connections between the interface units; and an administrative module for controlling connections provided by the switch fabric, wherein the administrative module comprises:

mass storage containing subscriber profiles, a processor for providing control instructions to the switch fabric, and a signaling interface for coupling the processor to a signaling link, for communication with an external network node, wherein:

in response to a virtual office equipment number received via the signaling interface, the processor retrieves a subscriber profile corresponding to the virtual office equipment number from the mass storage and uses the retrieved profile to process a selective connection through the switch between two of the interface units.

21. A method, comprising:

detecting a service request during processing of a call in a multiple link communication network;

receiving and processing speech signals from a person involved in the call via the communication network to identify the person as one of a plurality of subscribers;

instructing a switching office of the communication network to select one subscriber service profile corresponding to the identified subscriber, from a plurality of subscriber service profiles, for processing of communication service over a predetermined link; and providing the requested communication service for the call, over the predetermined link, based at least in part on the selected subscriber service profile.

22. A method as in claim 21, wherein the step of instructing a switching office comprises providing a virtual office equipment number to the switching office for use in retrieving the one subscriber service profile.

23. A method as in claim 21, wherein:

the step of detecting a service request comprises detecting a condition representing commencement of an outgoing call over the predetermined link;

the step of receiving and processing speech signals comprises receiving signals from the person over the predetermined link and comparing information characteristic of the received speech signals to stored speech data corresponding to a plurality of subscribers associated with the predetermined link.

24. A method as in claim 21, further comprising the step of:

during the provision of the communication service over the predetermined link, receiving and processing speech signals from a person using the predetermined link to determine whether or not the person currently using the predetermined link is the identified subscriber.

25. A method as in claim 24, further comprising interrupting the provision of the communication service over the predetermined link if the person currently using the predetermined link is not the identified subscriber.

26. A method as in claim 21, wherein the communication network comprises a telephone network having a plurality of central offices each of which serves a plurality of communication links.

27. A method as in claim 26, wherein the plurality of communication links comprise telephone lines.

28. A call processing method, comprising:

detecting a call to a telephone number associated with a communication link servicing a plurality of subscribers;

interacting with a caller to identify one of the subscribers intended as the recipient of the call;

obtaining a virtual office equipment number assigned to the subscriber; retrieving a subscriber service profile corresponding to the identified subscriber based on the virtual office equipment number; and processing the call in accord with the retrieved profile data.

29. A method as in claim 28, wherein the step of processing the call comprises applying a distinctive ringing signal associated with the identified subscriber to the communication link.

30. A method as in claim 28, wherein the step of processing the call comprises routing the call to a voice mail service associated with the identified subscriber.

31. A method as in claim 28, wherein the communication link is a telephone line.

32. A method, comprising:

identifying one party to a requested communication service as one of a plurality of subscribers;

using a virtual office equipment number, assigned to the identified one subscriber, to retrieve corresponding profile data from stored profile data for the plurality of subscribers; and providing the communication service over a link of a communication network based at least in part on the retrieved profile data.

33. A method as in claim 32, wherein the communication service is a call from the one identified subscriber through the communication network.

34. A method as in claim 33, wherein the step of identifying one party comprises analyzing speech information from the one party.

35. A method as in claim 32, wherein the communication service is a call through the communication network intended for the one identified subscriber.

36. A method as in claim 35, wherein the step of identifying one party comprises recognizing an identification of the one subscriber as a called party from a caller's speech.

37. A method as in claim 32, wherein:

the communication network comprises a telephone network having a telephone switching system; and the step of using the virtual office equipment number comprises supplying the virtual office equipment number to the telephone switching system and retrieving the corresponding profile data from storage in the telephone switching system.

* * * * *